US 10,598,081 B2

(12) United States Patent
McClellan et al.

(10) Patent No.: US 10,598,081 B2
(45) Date of Patent: Mar. 24, 2020

(54) PACKAGED ELECTRICAL ASSIST ASSEMBLY FOR SUPERCHARGED POWER PLANT

(71) Applicant: Eaton Intelligent Power Limited, Dublin (IE)

(72) Inventors: Sara Rose McClellan, Kalamazoo, MI (US); David James Schrock, Marshall, MI (US); Brian Thompson Smith, Royal Oak, MI (US); Vasilios Tsourapas, Northville, MI (US)

(73) Assignee: Eaton Intelligent Power Limited, Dublin (IE)

( * ) Notice: Subject to any disclaimer, the term of this patent is extended or adjusted under 35 U.S.C. 154(b) by 199 days.

(21) Appl. No.: 15/558,122

(22) PCT Filed: Mar. 11, 2016

(86) PCT No.: PCT/US2016/022121
§ 371 (c)(1),
(2) Date: Sep. 13, 2017

(87) PCT Pub. No.: WO2016/149123
PCT Pub. Date: Sep. 22, 2016

(65) Prior Publication Data
US 2018/0045103 A1 Feb. 15, 2018

Related U.S. Application Data

(60) Provisional application No. 62/133,038, filed on Mar. 13, 2015, provisional application No. 62/270,336, filed on Dec. 21, 2015.

(51) Int. Cl.
*F02B 33/38* (2006.01)
*F02B 39/04* (2006.01)
(Continued)

(52) U.S. Cl.
CPC .............. *F02B 33/38* (2013.01); *F02B 39/04* (2013.01); *F02B 39/10* (2013.01); *F02D 23/00* (2013.01);
(Continued)

(58) Field of Classification Search
CPC .......... F02B 33/38; F02B 39/04; F02B 39/10; F02D 23/00; F02D 23/005; F16H 37/027; F16H 3/66; F16H 3/721; Y02T 10/144
See application file for complete search history.

(56) References Cited

U.S. PATENT DOCUMENTS 5,875,766 A * 3/1999 Ozawa ................... B60K 17/16
123/561
5,890,468 A * 4/1999 Ozawa ................. F02B 37/005
123/561
(Continued)

FOREIGN PATENT DOCUMENTS

GB      2 390 871 A      1/2004
JP   2010-500506 A      1/2010
(Continued)

OTHER PUBLICATIONS

International Search Report and Written Opinion of the International Searching Authority for corresponding International Patent Application No. PCT/US2016/022121 dated Jul. 29, 2016, 15 pages.
(Continued)

*Primary Examiner* — Jesse S Bogue
(74) *Attorney, Agent, or Firm* — Merchant & Gould P.C.

(57) ABSTRACT

Packaged boost systems and electrical assist assemblies presented. In one example, packaged boost system includes a supercharger, a brake assembly, and a transmission assembly that are packaged together in a generally axisymmetric configuration. In one example, a packaged electrical assist
(Continued)

assembly includes a supercharger, a transmission assembly, and a brake assembly that are packaged together in a generally axisymmetric configuration.

14 Claims, 18 Drawing Sheets

(51) Int. Cl.
*F02B 39/10* (2006.01)
*F16H 3/66* (2006.01)
*F02D 23/00* (2006.01)
*F16H 3/72* (2006.01)
*F16H 37/02* (2006.01)

(52) U.S. Cl.
CPC ............ *F02D 23/005* (2013.01); *F16H 3/66* (2013.01); *F16H 3/721* (2013.01); *F16H 37/027* (2013.01); *Y02T 10/144* (2013.01)

(56) References Cited

U.S. PATENT DOCUMENTS

| | | | | |
|---|---|---|---|---|
| 6,048,288 | A * | 4/2000 | Tsujii | B60H 1/3222 477/5 |
| 6,537,169 | B1 * | 3/2003 | Morii | F16H 3/721 475/10 |
| 6,631,702 | B2 * | 10/2003 | Tonnqvist | B60K 6/24 123/195 A |
| 8,196,686 | B2 | 6/2012 | Grieve | |
| 8,490,394 | B2 * | 7/2013 | Lofgren | F02B 37/105 123/559.1 |
| 2002/0096156 | A1 * | 7/2002 | Palazzolo | F02B 39/04 123/559.1 |
| 2003/0089348 | A1 * | 5/2003 | Janson | F02B 33/40 123/559.1 |
| 2004/0237949 | A1 | 12/2004 | Yasui et al. | |
| 2006/0032225 | A1 * | 2/2006 | Dyne | F02B 37/10 60/607 |
| 2007/0137626 | A1 | 6/2007 | Turner | |
| 2007/0149336 | A1 * | 6/2007 | Sallstrom | B60K 6/485 475/5 |
| 2010/0071673 | A1 * | 3/2010 | Prior | F02B 33/38 123/559.3 |
| 2010/0155157 | A1 | 6/2010 | Grieve | |
| 2011/0131983 | A1 | 6/2011 | Loefgren | |
| 2013/0160749 | A1 * | 6/2013 | Creager | F02B 39/12 123/559.3 |
| 2014/0224228 | A1 * | 8/2014 | Benjey | B60K 6/485 123/559.3 |
| 2015/0047617 | A1 * | 2/2015 | Benjey | B60K 6/485 123/559.3 |
| 2015/0066272 | A1 * | 3/2015 | Benjey | B60K 6/485 701/22 |
| 2015/0377158 | A1 * | 12/2015 | Benjey | F02B 39/10 701/22 |

FOREIGN PATENT DOCUMENTS

| | | | | |
|---|---|---|---|---|
| WO | 2013/148205 | A1 | 10/2013 | |
| WO | 2013/148206 | A2 | 10/2013 | |
| WO | WO-2013148205 | A1 * | 10/2013 | ............ B60K 6/485 |
| WO | 2014/165233 | A1 | 10/2014 | |
| WO | 2015/108930 | A1 | 7/2015 | |

OTHER PUBLICATIONS

Extended European Search Report for corresponding European Patent Application No. 16765507.5 dated Aug. 13, 2018, 7 pages.

* cited by examiner

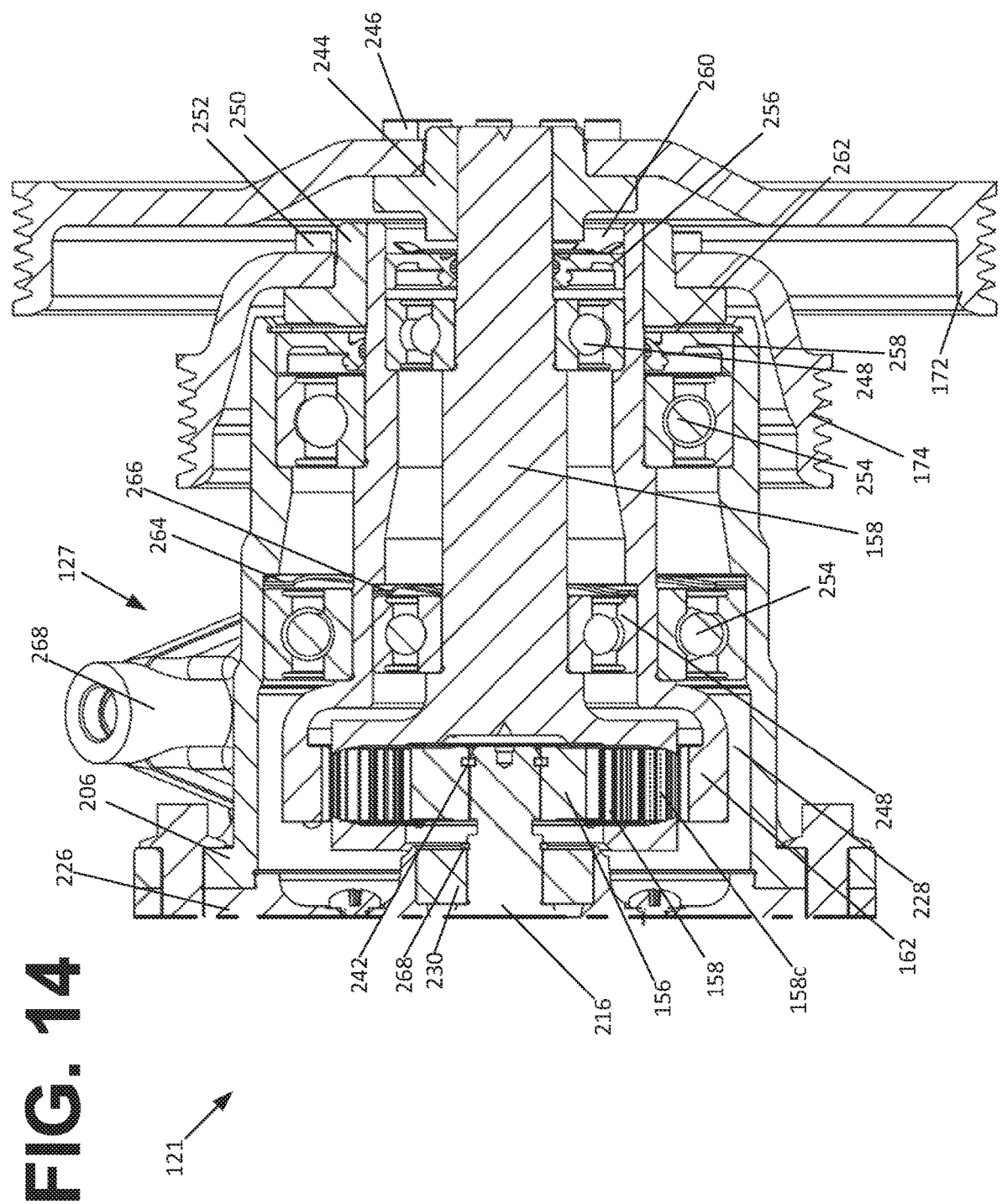

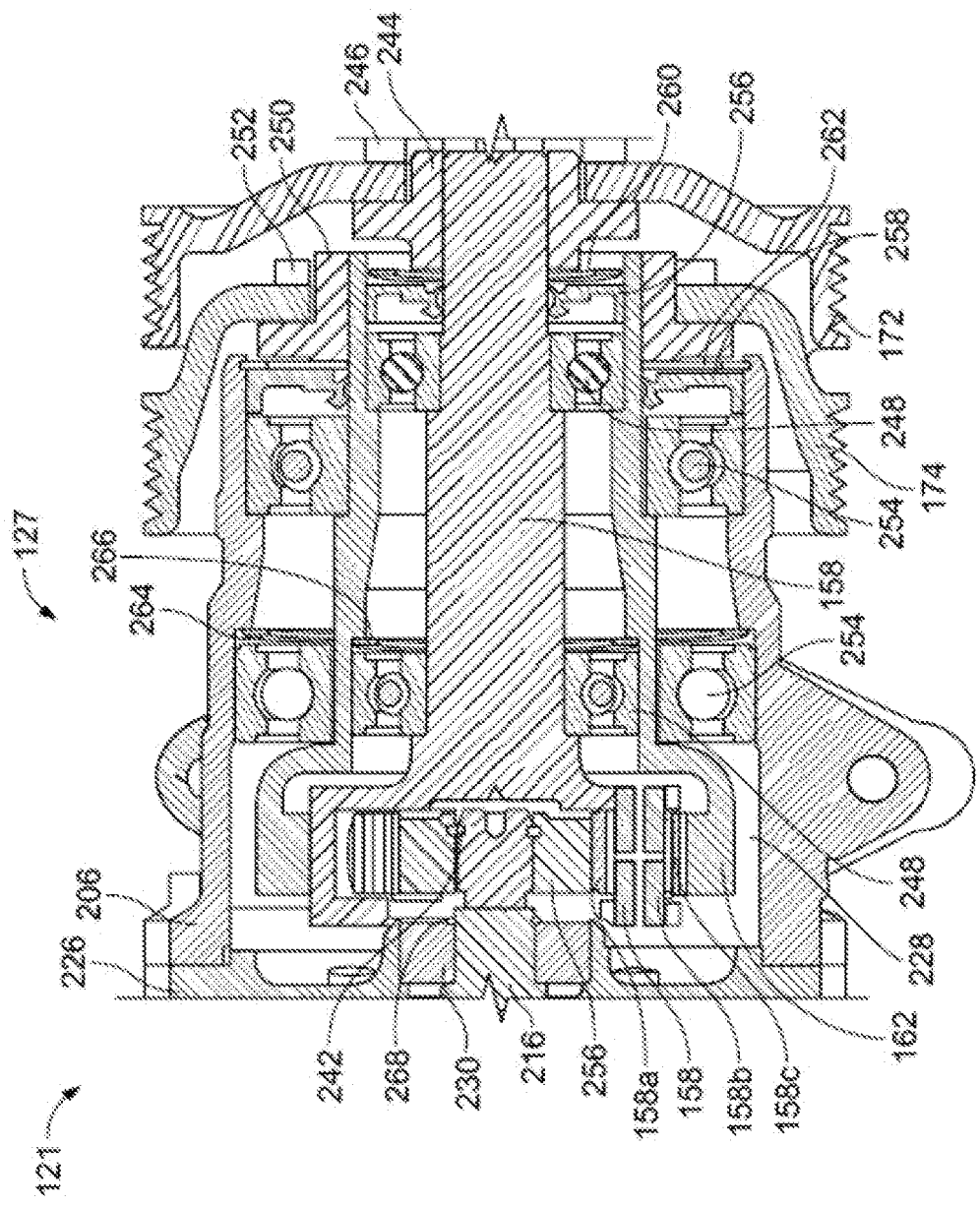

PACKAGED ELECTRICAL ASSIST ASSEMBLY FOR SUPERCHARGED POWER PLANT

CROSS-REFERENCE TO RELATED APPLICATIONS

This application is a U.S. National Stage Application of PCT/US2016/022121, filed on Mar. 11, 2016, which claims the benefit of U.S. Patent Application Ser. No. 62/270,336, filed on Dec. 21, 2015 and claims the benefit of U.S. Patent Application Ser. No. 62/133,038, filed on Mar. 13, 2015, the disclosures of which are incorporated herein by reference in their entireties. To the extent appropriate, a claim of priority is made to each of the above disclosed applications.

TECHNICAL FIELD

The present teachings generally include electrically assisted variable speed systems for use in conjunction with a power plant and a super charger that provides increased air pressure to the power plant.

BACKGROUND

Energy efficient engines of reduced size are desirable for fuel economy and cost reduction. Smaller engines provide less torque than larger engines. To increase the torque capacity available from smaller engines, boosting systems have been developed for boosting the air pressure at the engine intake to increase the torque available from the engine. Conventional boosting systems can include superchargers.

SUMMARY

A packaged electrical assist assembly for interfacing with a supercharger associated with an internal combustion engine, the packaged electrical assist assembly including: an electric motor/generator including a first drive shaft; a planetary gear set including a sun gear, a ring gear and a carrier that carries planetary gears, the carrier, the sun gear and the ring gear being configured to rotate about a central axis of the planetary gear set, wherein the ring gear is fixed to the electric motor/generator first drive shaft; a second drive shaft fixed to the sun gear; a brake attached to the second drive shaft, the brake being for providing a braking force to the second drive shaft; a first pulley attached to the second drive shaft, the first pulley being configured to engage with a first drive belt associated with the supercharger; and a second pulley operably connected to the carrier, the second pulley being configured to engage with a second belt associated with a front end accessory drive of the internal combustion engine.

In one example, a modular packaged boost assembly is provided in which various superchargers, brake assemblies, and transmission assemblies can be attached to each other to achieve desired performance characteristics.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 14 is an enlarged cross-sectional view of the power transmission portion of the packaged boost assembly view of FIG. 11.

FIG. 14A is an enlarged cross-sectional view of the power transmission portion of the packaged boost assembly view of FIG. 11, but with an alternate pulley arrangement shown.

DETAILED DESCRIPTION

Figure 1:
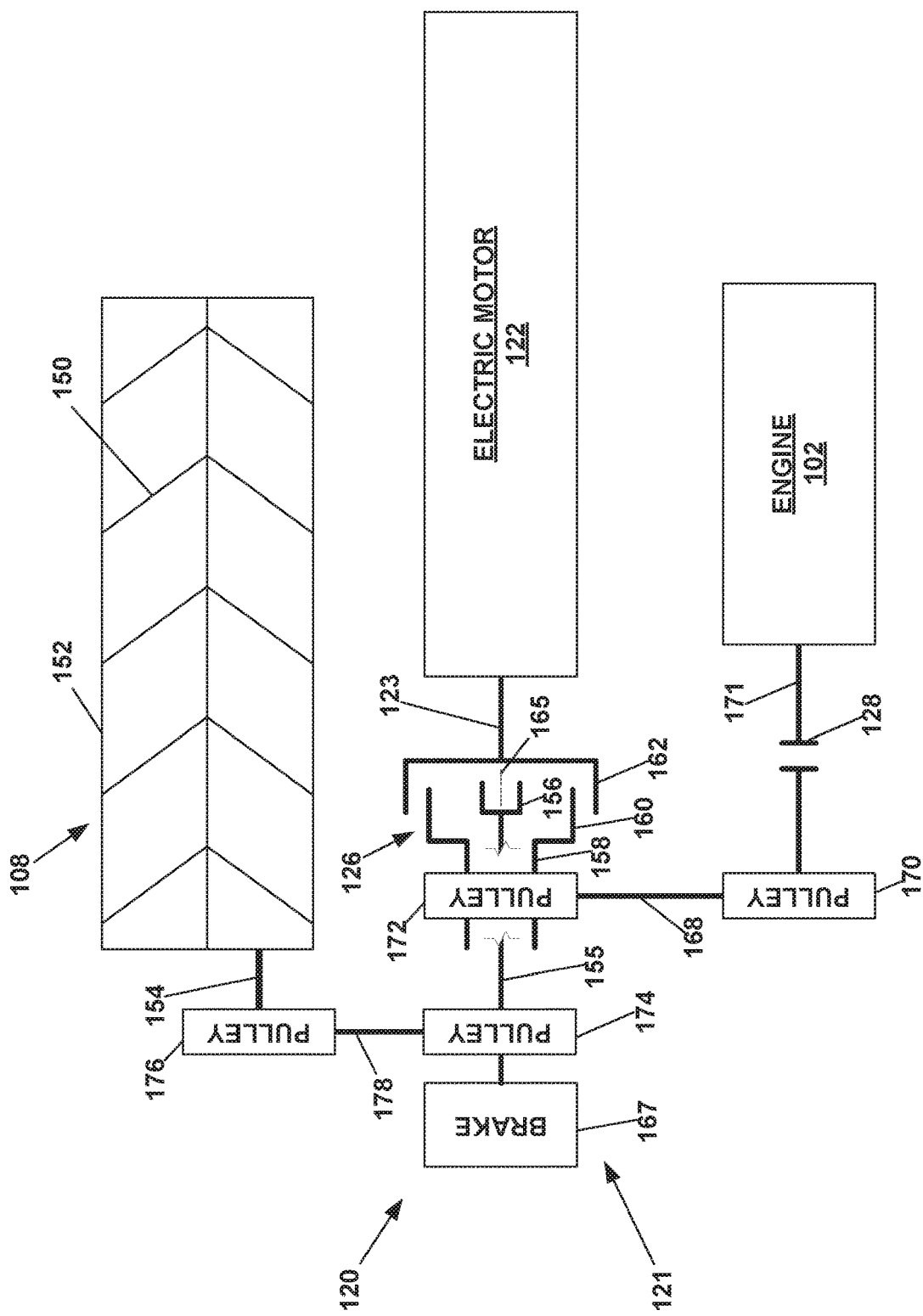
FIG. 1 is a schematic system layout of a hybrid boosting system including a supercharger and a packaged electrical assist assembly in accordance with the principles of the present disclosure incorporated into an air intake system of an engine.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General System Description

Figure 13:
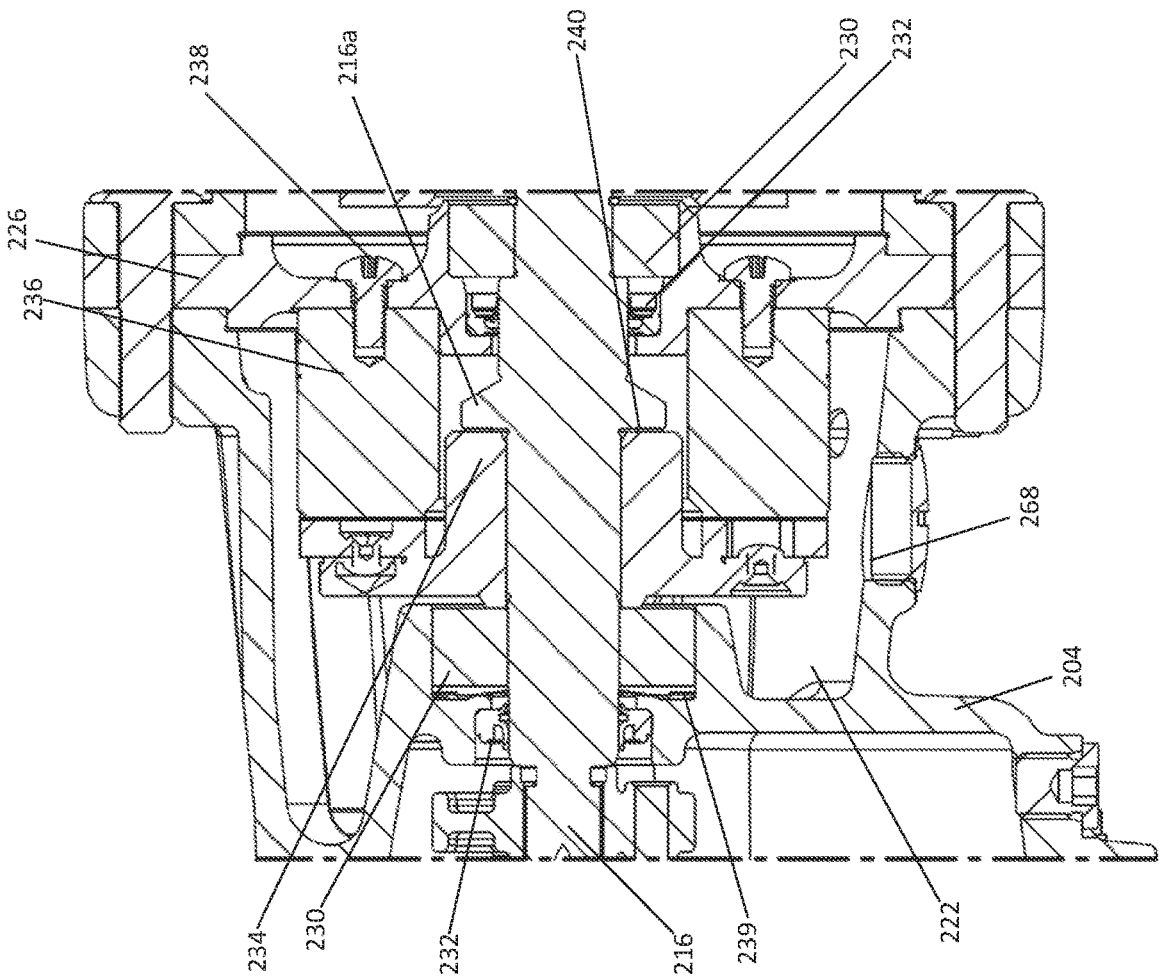
FIG. 13 is an enlarged cross-sectional view of the brake portion of the packaged boost assembly view of FIG. 11.

With reference to FIG. 13, an example boosting system 100 in accordance with the principles of the present disclosure is illustrated. The boosting system 100 is configured to increase the boost pressure provided to an engine 102. In certain examples, the engine 102 can include a gasoline engine having an intake manifold 104 and a throttle 106. The boosting system 100 is also depicted including a supercharger 108. The supercharger 108 is positioned along an air intake of the engine 102. The supercharger 108 is powered by a hybrid drive system 120. The hybrid drive system 120 is configured to use torque mechanically transferred from the engine 102 (e.g., from the engine crankshaft) to drive the supercharger 108, and is also configured to use torque generated from an electric motor/generator 122 having an output shaft 123 to provide torque to the supercharger 108. The electric motor/generator 122 can be powered by a battery 124 when functioning as an electric motor, and can be used to charge the battery 124 when functioning as a generator 122. In certain examples, the electric motor/generator 122 can interface with an electronic controller that controls operation of the electric motor/generator 122 in both the generating state and in the motoring state. The hybrid drive system 120 can further include a gear set such as a planetary gear set 126 that allows torque to be transferred between the supercharger 108, the electric motor/generator 122 and the crankshaft of the engine 102. In certain examples, a clutch 128 can be provided for selectively coupling the planetary gear set to the engine and for decoupling the planetary gear set from the engine.

Referring still to FIG. 13, the boosting system 100 can include an intercooler 130 for cooling the intake air provided to the intake manifold 104. The boosting system 100 also includes a bypass line 134 that bypasses the supercharger 108. Flow through the bypass line 134 is controlled by a valve 136 that can open flow, close flow or proportion flow. In the depicted example, the throttle 106 is positioned between the supercharger 108 and the engine 102 such that the throttle 106 is positioned downstream from the supercharger 108. In other examples, the throttle can be positioned upstream from the supercharger 108.

In certain examples, the hybrid drive system 120 can be configured to provide the boosting system with various functions and can be operated in various modes. In certain examples, the hybrid drive system 120 can be provided with a brake 167 for applying a braking force to the rotors of the supercharger 108 such that the rotors of the supercharger 108 are prevented from rotating. In such an example, with the supercharger brake open, the electric motor/generator 122 can be operated to vary the speed of the supercharger 108 to control and vary the boost rate based on the operating condition of the engine. This mode can be referred to as a variable speed boost mode. In this mode, torque from the electric motor/generator 122 can be used to boost the speed of the supercharger to a rate that is higher than can be achieved mechanically via torque from the engine crankshaft. In this mode, the electric motor/generator 122 can be operated as a generator and used to slow the speed of the supercharger to a speed slower than what would be provided mechanically via the gear ratio between the crankshaft and the supercharger input shaft. In this case, excess charge air is reduced and the battery can be recharged. In an engine start/stop mode, the supercharger brake can be locked and the electric motor 122 can provide torque to the engine for starting. With the supercharger brake locked, the system can be operated in a brake regeneration mode in which the electric motor/generator 122 is operated as a generator and is used to recover energy associated with braking (i.e., torque from the crankshaft is transferred to the motor/generator thereby slowing the engine during braking). With the supercharger brake locked, the boosting system can be operated in a torque assist mode in which the electric motor 122 is operated as a motor and is used to provide supplemental torque to the engine. With the supercharger brake locked, the hybrid drive system 120 can also be operated in an alternator mode in which the electric motor/generator functions as a generator and uses torque from the engine to charge the battery. It will be appreciated that further details relating to example hybrid drive systems that can be incorporated into the present boosting system are disclosed in U.S. Provisional patent application Ser. No. 11/776,834; U.S. Provisional Patent Application Ser. No. 61/776,837; PCT Application No. PCT/US2013/003094; and PCT Application No. PCT/US2015/11339, all of which are hereby incorporated by reference in their entireties.

Example Configurations

FIGS. 1-7 illustrate example configurations of the hybrid drive system 120. For each of the disclosed systems, the electric motor 122, supercharger 108, and brake 167 can be placed in the previously described operational modes to increase engine performance. Those modes are the variable speed mode, the engine start/stop mode, the brake regeneration mode, the torque assist mode, and the alternator mode.

Each of the example configurations includes the supercharger 108. The supercharger 108 includes intermeshed rotors 150 positioned within a supercharger housing 152. Timing gears can be provided for transferring torque between the rotors 150 and for ensuring that the rotors 150 rotate at the same speed. An input shaft 154 can supply torque to one of the rotors 150. In certain examples, the supercharger 108 can be a Roots-type supercharger that has a fixed air displacement for each rotation of the rotors 150. An example supercharger with Roots-type rotors is disclosed at U.S. Pat. No. 7,488,164 that is hereby incorporated by reference in its entirety.

As shown, each of the configurations also includes the planetary gear set 126 which includes a sun gear 156, a carrier 158 that carries planetary gears 160 that surround and intermesh mesh with the sun gear 156, and a ring gear 162 that surrounds and intermeshes with the planetary gears 160. The ring gear 162, the carrier 158 and the sun gear 156 all can rotate about a common axis of rotation 165. Each of the disclosed hybrid drive systems 120 further includes the brake 167 (e.g. a clutch style brake) for selectively braking at least one of the rotor shafts (e.g., the input shaft 154), as explained further herein.

Figure 2:
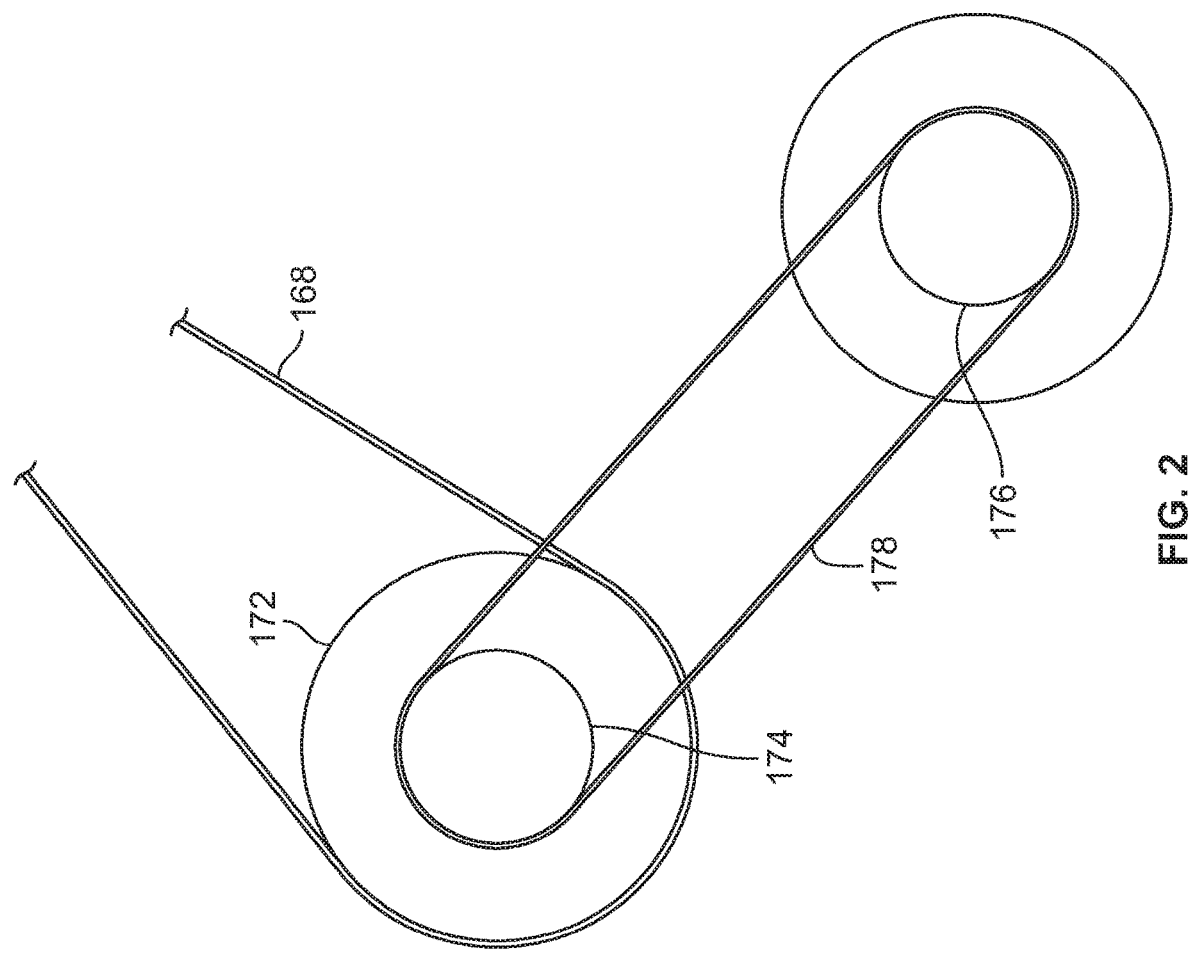
FIG. 2 is a schematic front end view of the hybrid boost system presented in FIG. 1.

In the specific configuration shown at FIGS. 1-2, a portion of the hybrid drive system 120 is configured as a packaged electrical assist assembly 121 which interfaces with an independent supercharger 108 and the engine 102. In such an embodiment, the electric motor/generator 122 is shown integrated with the ring gear 162, wherein the drive shaft 123 (e.g., a rotation member) of the electric motor/generator 122 is coupled directly to the ring gear 162 and is rotatable about the common axis 165 with the ring gear 162. The hybrid drive system 120 also includes a belt 168 that transfers torque from a pulley 170 coupled to the crankshaft 171 of the engine 102 (e.g., either directly or via clutch 128 through the front end accessory drive) to a pulley 172 coaxially aligned with the axis of rotation 165. The pulley 172 is coupled to and rotates in unison with the carrier 158 about the axis 165.

The sun gear 156 is coupled to a drive shaft 155 which is in turn coupled to a pulley 174 and the brake 167. The pulley 174 is coupled to a belt 178 that transfers torque from the pulley 174 to the supercharger input shaft 154 via a pulley 176 mounted to the input shaft 154. As configured, the rotors 150 of the supercharger 108 are prevented from rotating when the brake 167 is activated. When the brake 167 is activated, the shaft 154 is prevented from rotating by the brake 167 such that pulley 174, belt 178, pulley 176, and sun gear 156 are also prevented from rotating. As the pulley 176 is coupled to the input shaft 154 of the supercharger, the supercharger rotors 150 are prevented from rotating when pulley 176 is prevented from rotating. When the brake 167 is activated, the electric motor 122 is able to transfer torque directly to the engine 102, and vice-versa, via pulleys 170, 172 and belt 168.

In the embodiment shown, the electric motor 122, planetary gear set 126, brake 167, and pulleys 172, 174 form the single packaged electrical assist assembly 121, and can thus be used in conjunction with various supercharger 108 and engine 102 configurations. By providing these components of the hybrid drive system 120 together, a smaller overall form factor can result such that the system can be installed in compartments with relatively low available installation volume. As such, existing power plant designs can be adapted with minimal design changes to accept the assembly 121 in forming the hybrid drive system 120. The assembly 121 can also be used in retrofit applications, wherein the hybrid drive system 120 is formed by adding the assembly 121 to an existing engine 121 and by providing a separate supercharger 108, if not already provided.

By braking at least one of the rotor shafts, the sun gear is also braked. In one example, the brake 167 can be configured to ground at least one of the rotor shafts to the supercharger housing 152. In one example, the brake 167 can be configured to ground the rotor shaft to an end portion of the supercharger housing that defines an inlet of the supercharger and encloses the brake. In the depicted example, the brake 167 is positioned at an end of the supercharger housing 152 that is opposite from the end of the supercharger housing at which the planetary gear set, the timing gears and the electric motor/generator are mounted.

Figure 3:
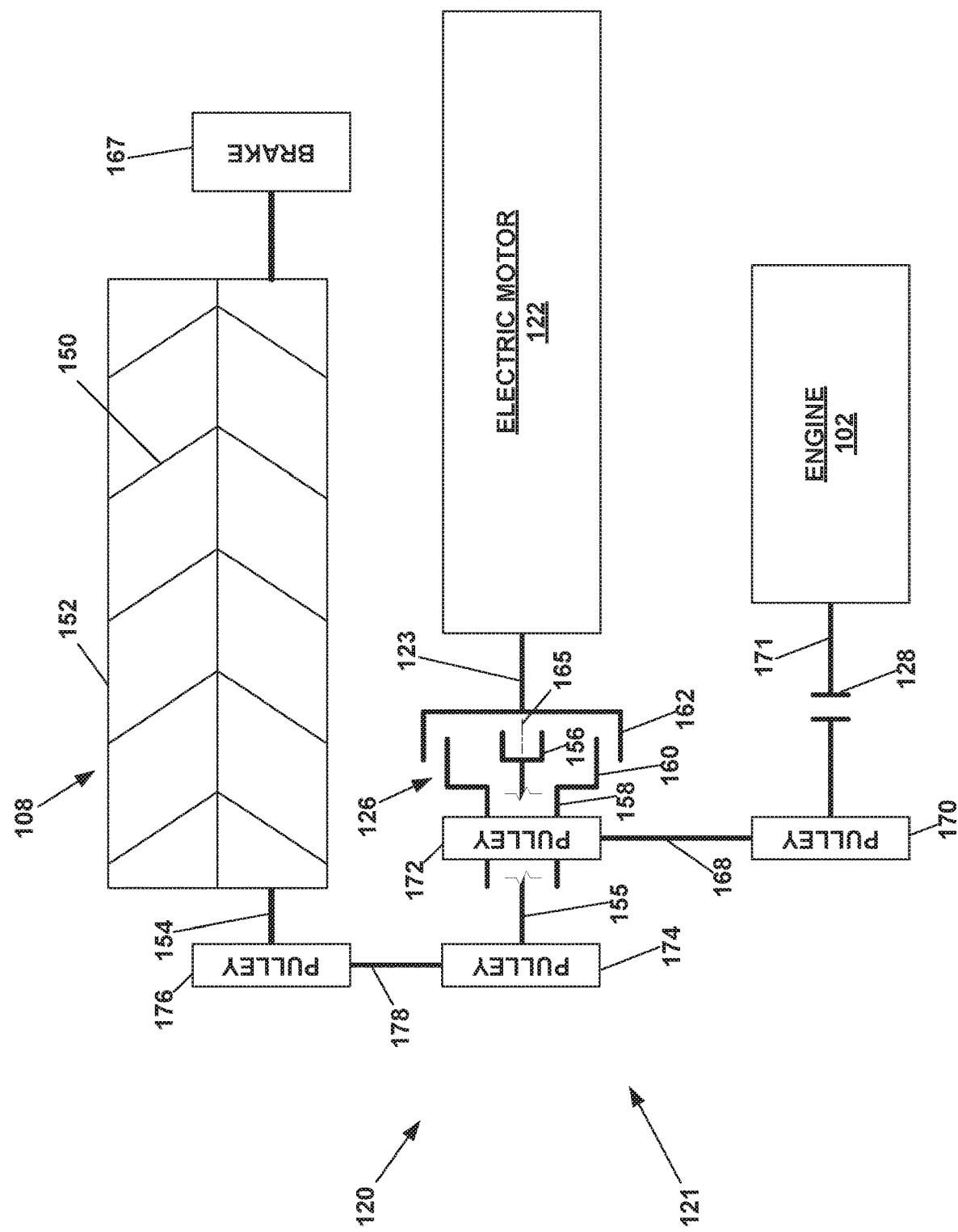
FIG. 3 is a schematic system layout of a second embodiment of a hybrid boosting system including a supercharger and a packaged electrical assist assembly in accordance with the principles of the present disclosure incorporated into an air intake system of an engine.

A second embodiment of the hybrid drive system 120 is shown at FIG. 3. As many of the concepts and features are similar to the first embodiment shown in FIGS. 1-2, the description for the previous embodiment is hereby incorporated by reference for the second embodiment. Where like or similar features or elements are shown, the same reference numbers will be used where possible. The following description for the second embodiment will be limited primarily to the differences between this embodiment and previously described embodiment. The example shown in FIG. 3 is different from the example shown in FIG. 1 in that the brake 167 is positioned at an end of the supercharger housing 152 that is opposite from the end of the supercharger housing at which the pulley 176 is mounted. Thus, the supercharger rotors 150 can be braked directly rather than via shaft 155, pulleys 174, 176, and belt 178 in this example. In this embodiment, the electric motor 122, planetary gear set 126, and pulleys 172, 174 form the single packaged electrical assist assembly 121.

Figure 4:
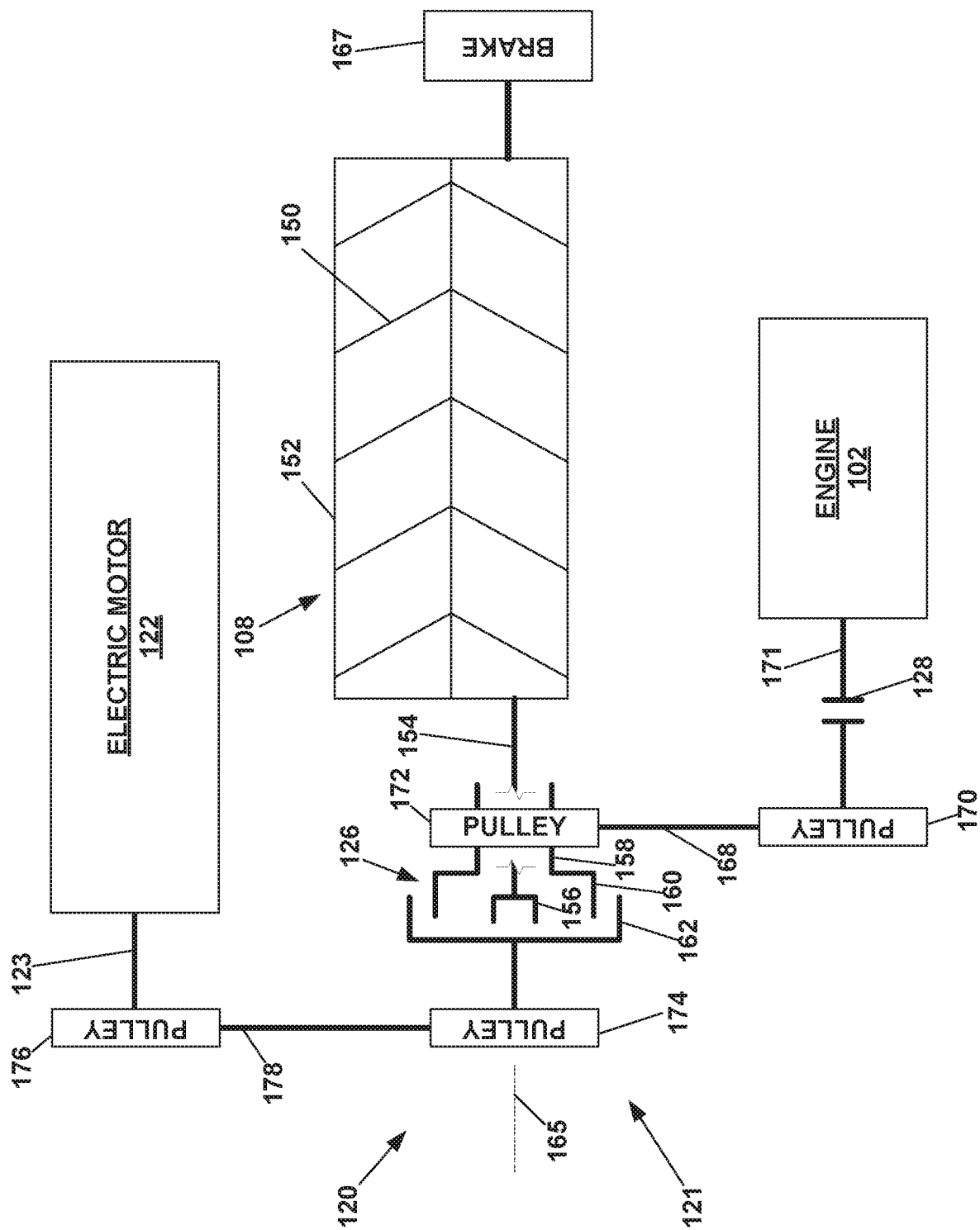
FIG. 4 is a schematic system layout of a third embodiment of a hybrid boost assembly in accordance with the principles of the present disclosure incorporated into an air intake system of an engine.
Figure 5:
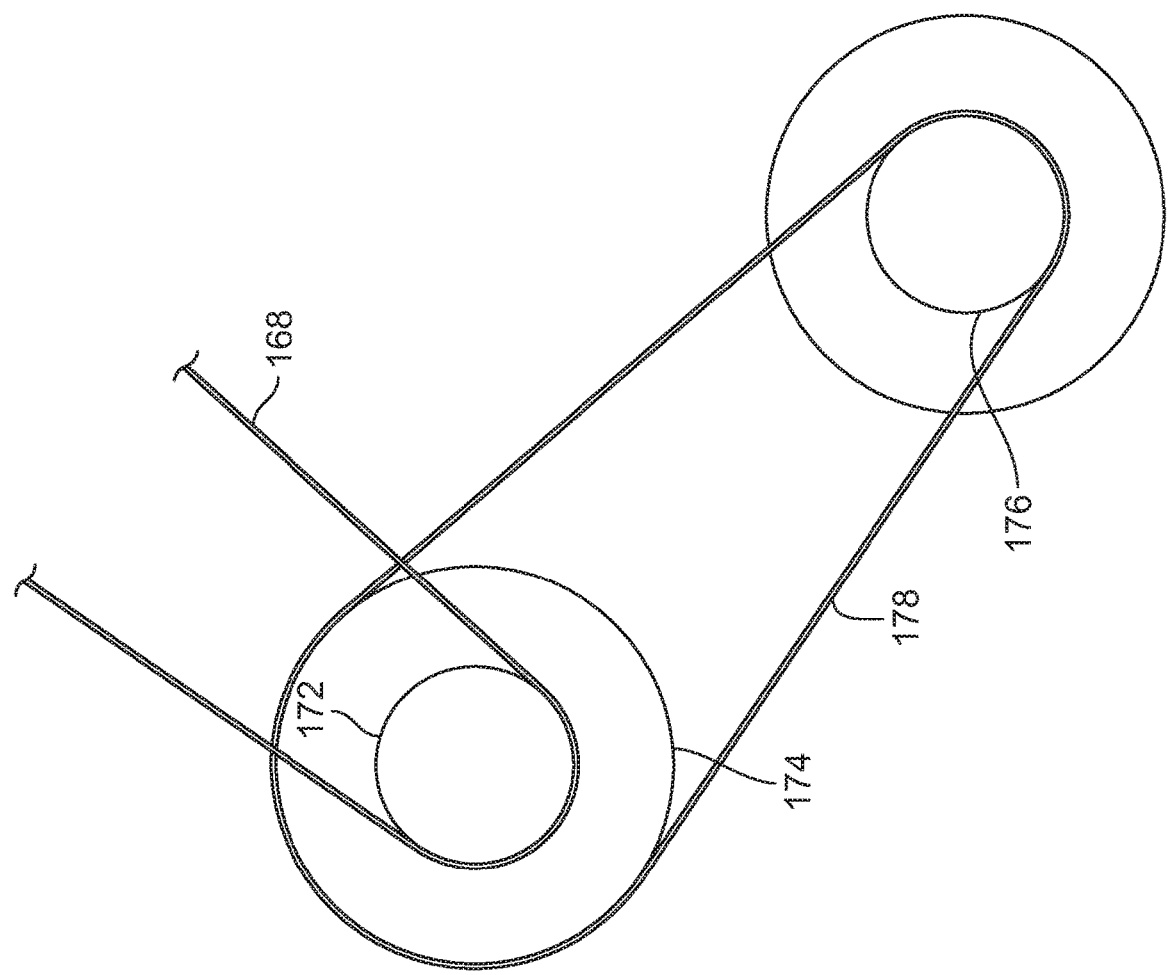
FIG. 5 is a schematic front end view of the hybrid boost assembly presented in FIG. 4.

A third embodiment of the hybrid drive system 120 is shown at FIGS. 4-5. As many of the concepts and features are similar to the previous embodiments shown in FIGS. 1-3, the description for the previous embodiments are hereby incorporated by reference for the third embodiment. Where like or similar features or elements are shown, the same reference numbers will be used where possible. The following description for the third embodiment will be limited primarily to the differences between this embodiment and previously described embodiments. The third embodiment is different from the previous embodiments in that the planetary gear set 126 is mounted to the supercharger 108 such that the supercharger output shaft 154 is connected to the sun gear 156, the carrier 158 is connected to the engine 102 via pulleys 170, 172 and belt 168, and the ring gear 162 is connected to the electric motor output shaft 123 via pulleys 174, 176 and belt 178. It is noted that the ring gear can be configured with an integral pulley. Similar to the second embodiment, the example shown in FIGS. 4-5 also includes the brake 167 mounted to the supercharger 108. Although many of the major components of the hybrid drive system 120 are located on the supercharger 108, this third example does have the advantage of reduced form factor as a result of the electric motor 122 being independent and separately mounted from the supercharger 108. As the motor 122 and supercharger 108 are connected through drive belt 178, each of the motor 122 and supercharger 108 can be mounted to the engine 102 or within the engine compartment in a manner that is most space efficient.

Figure 6:
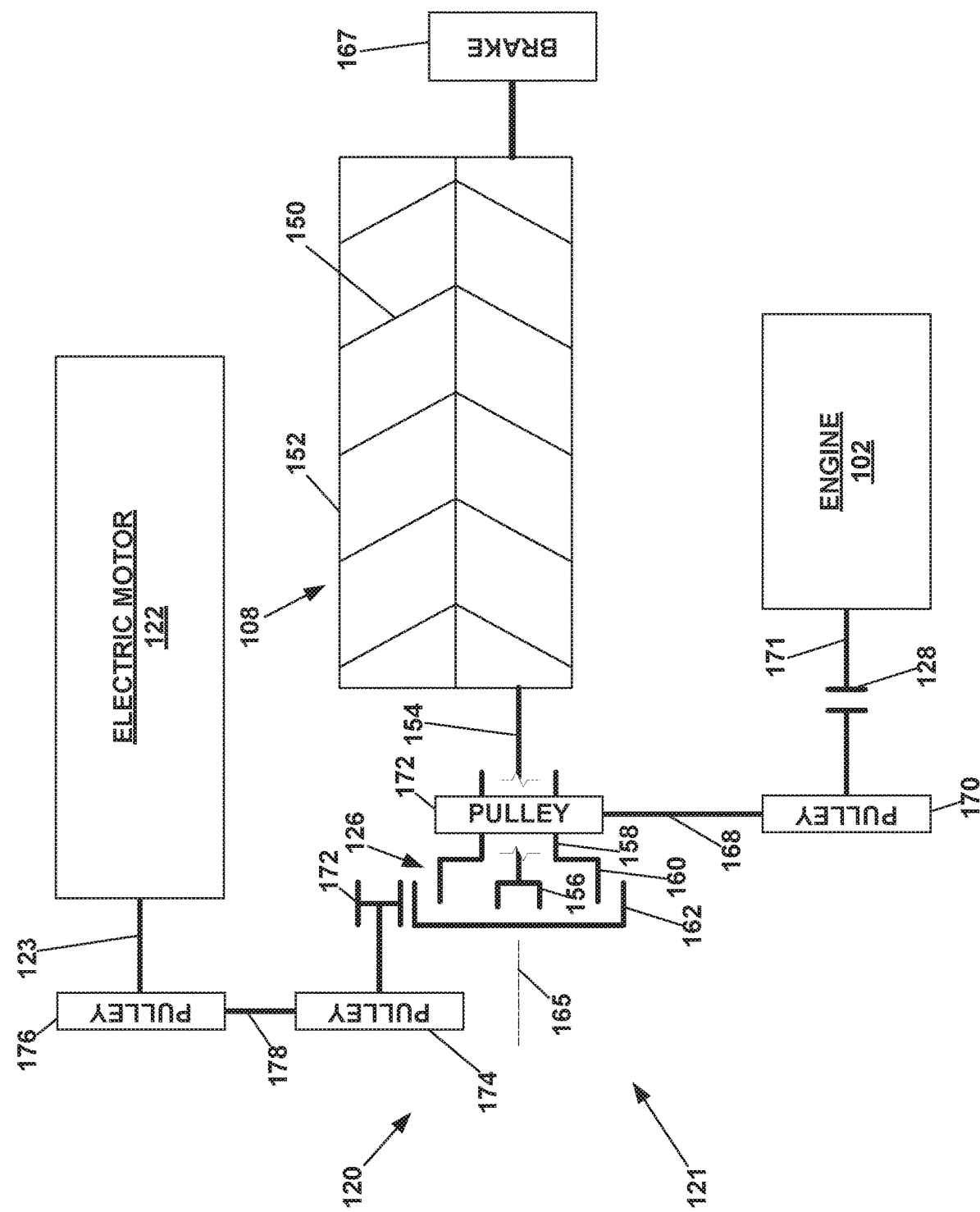
FIG. 6 is a schematic system layout of a fourth embodiment of a hybrid boost assembly in accordance with the principles of the present disclosure incorporated into an air intake system of an engine.
Figure 7:
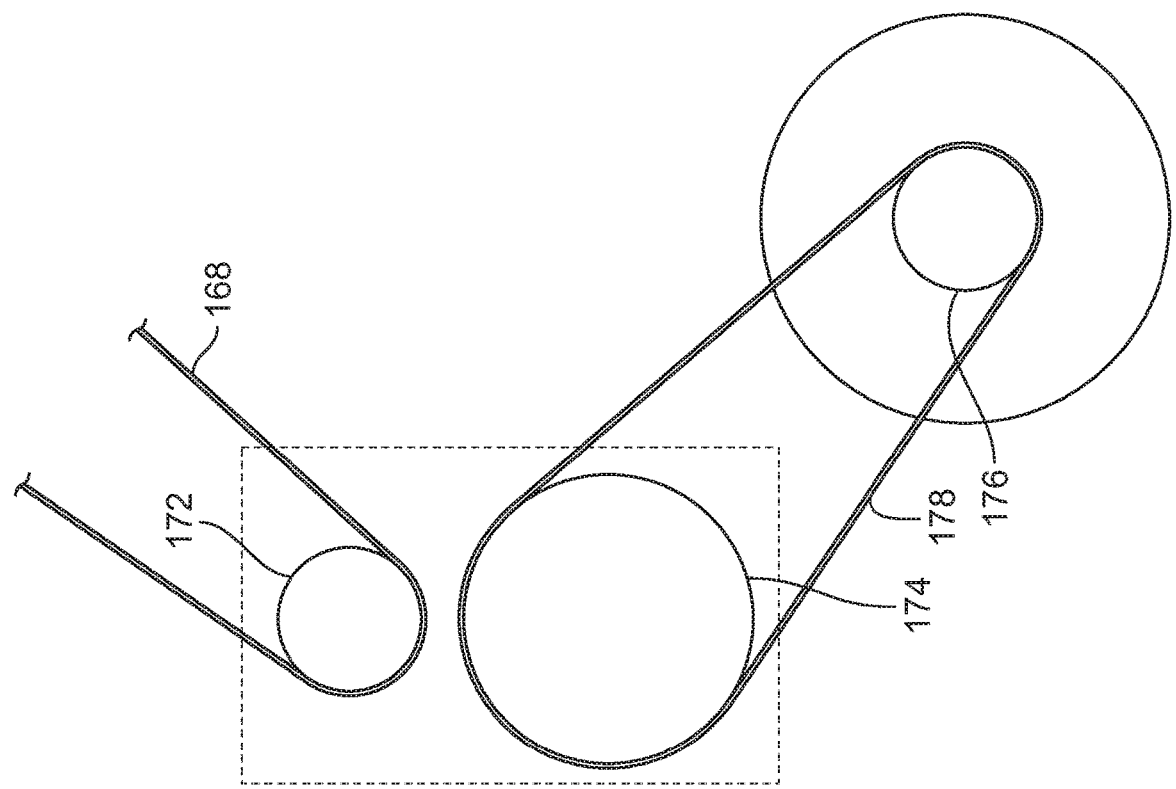
FIG. 7 is a schematic front end view of the hybrid boost assembly presented in FIG. 6.
Figure 8:
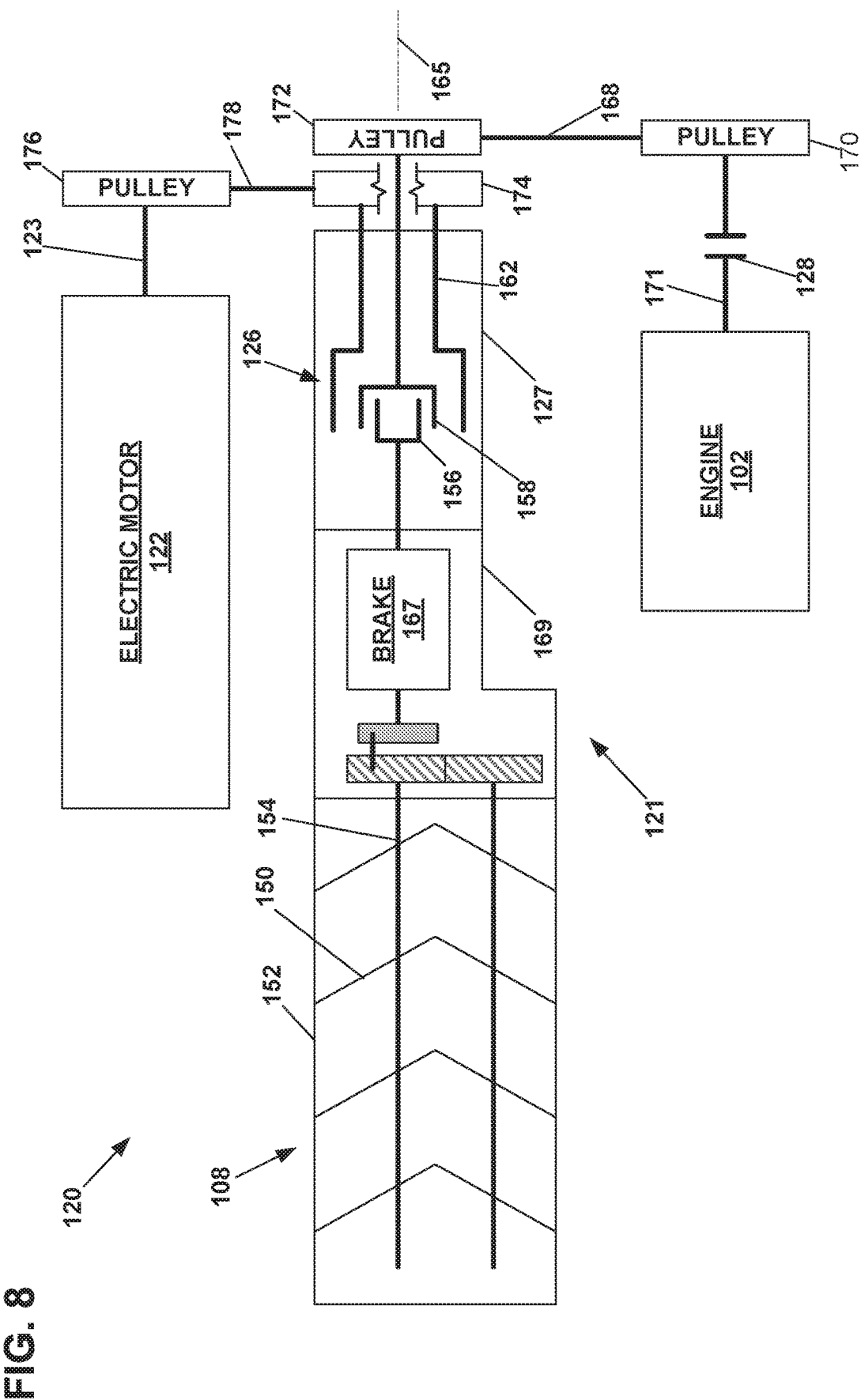
FIG. 8 is a schematic system layout of a fifth embodiment of a hybrid boost system including a packaged boost assembly in accordance with the principles of the present disclosure incorporated into an air intake system of an engine.

A fourth embodiment of the hybrid drive system 120 is shown at FIGS. 6-7. As many of the concepts and features are similar to the previous embodiments shown in FIGS. 1-5, the description for the previous embodiments are hereby incorporated by reference for the third embodiment. Where like or similar features or elements are shown, the same reference numbers will be used where possible. The following description for the fourth embodiment will be limited primarily to the differences between this embodiment and previously described embodiments. The fourth embodiment is similar to the third embodiment with the exception that an idler gear 172 is placed between the ring gear 162 of the planetary gear set 126 and the electric motor 122. As with the third embodiment, this fourth example does have the advantage of reduced form factor as a result of the electric motor 122 being independent and separately mounted from the supercharger 108. As the motor 122 and supercharger 108 are connected through drive belt 178, each of the motor 122 and supercharger 108 can be mounted to the engine 102 or within the engine compartment in a manner that is most space efficient.

A fifth embodiment of the hybrid drive system 120 is shown at FIGS. 8-12, wherein the system 120 includes a packaged boost assembly 121 composed of the supercharger 108, the brake 167, planetary gear set 126 and pulleys 172, 174 combined into a single package. A schematic representation of the system 120 and assembly 121 is presented at FIG. 8 while FIGS. 9-12 show an example of a structural arrangement of the packaged boost assembly 121.

As many of the concepts and features are similar to the previous embodiments shown in FIGS. 1-7, the description for the previous embodiments are hereby incorporated by reference for the fifth embodiment. Where like or similar features or elements are shown, the same reference numbers will be used where possible. The following description for the fifth embodiment will be limited primarily to the differences between this embodiment and previously described embodiments.

The fifth embodiment is operationally similar to the embodiment shown at FIG. 4, but with the brake 167 moved to a location that is between the supercharger 108 and the planetary gear set 126. The planet gear set 126 is arranged such that the ring gear 162 remains coupled to the pulley 174, the carrier 162 is coupled to the pulley 172 and the sun gear 156 is coupled to a drive member associated with the supercharger 108 and the brake 167. However, the fifth embodiment differs in that the relative positions of the pulleys 172, 174 are reversed.

Figure 9:
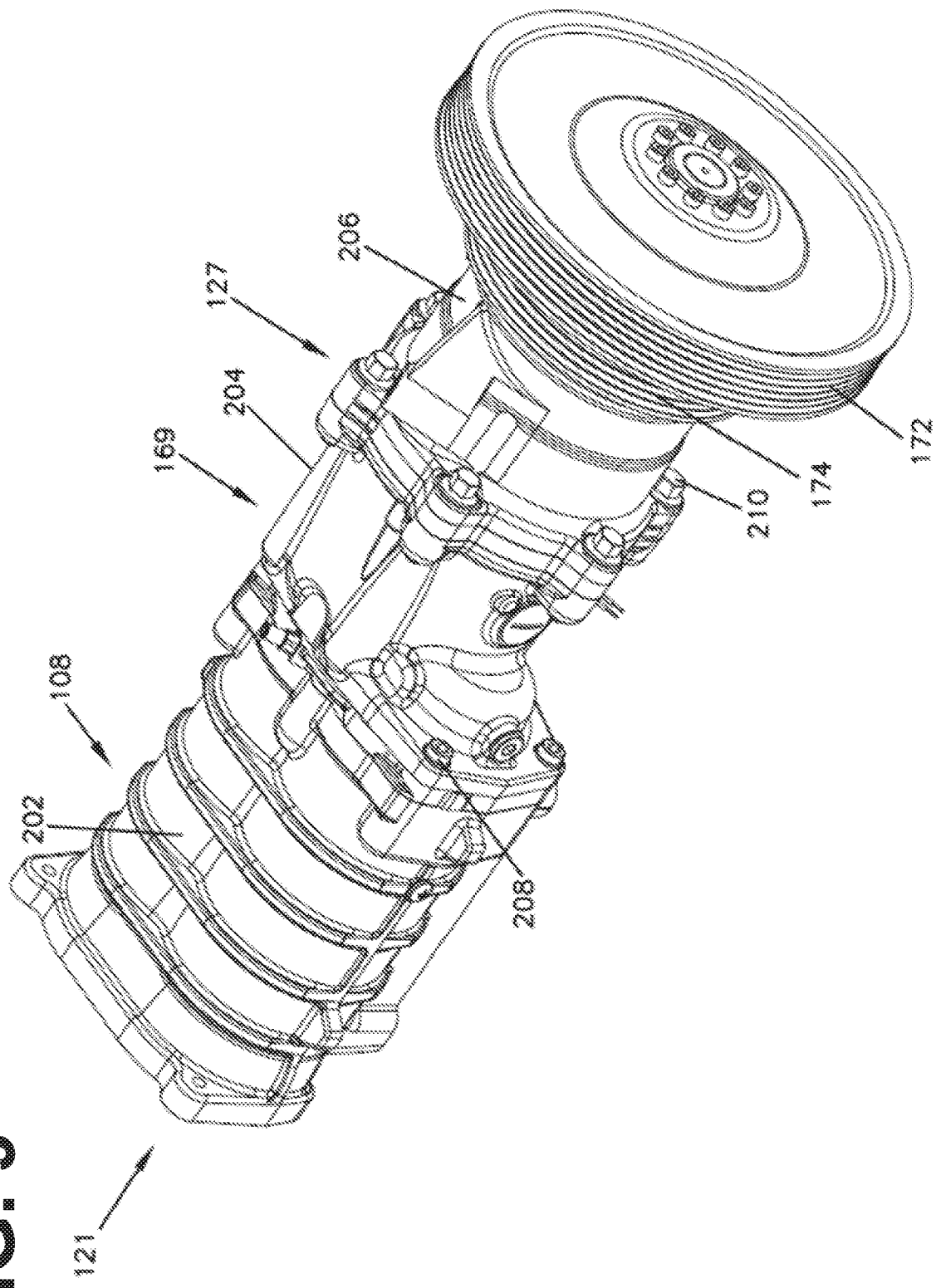
FIG. 9 is a perspective view of a structural arrangement of the packaged boost assembly shown in FIG. 8.

With reference to FIGS. 9-12, a structural arrangement of the packaged boost assembly 121 is presented. As shown at FIG. 9, the packaged boost assembly 121 includes a supercharger section 108 including a supercharger housing 202, a brake section 169 including a brake housing 204, and a power transmission section 127 including a transmission housing 206. As shown, the brake housing 204 is bolted to the supercharger housing 202 via a plurality of fasteners 208 and is additionally bolted to the transmission housing 206 via a plurality of fasteners 210. Fasteners 208, 210 can be any type of suitable mechanical fastener, for example, screws that engage with threaded apertures within the housings 202, 204, and/or 208 or bolts and nuts. Although the supercharger housing 202, brake housing 204, and transmission housing 206 are shown as being separate housings, other arrangements exists. For example, the brake housing 204 could be integrated into the supercharger housing 202 or the transmission housing 206. The supercharger housing 202, brake housing 204, and transmission housing 206 could also be defined within a single housing structure as well. One benefit to providing separate housings 202, 204, 206 is that various combinations of superchargers 108, brake sections 169, and transmission sections 127 can be assembled to meet a particular application without requiring the build-up of a customized or specific arrangement that might be required where a single housing for the entire assembly 121 is provided.

With continued reference to FIG. 9, it can be seen that the pulleys 172, 174 are arranged immediately adjacent to each other at one end of the transmission housing 2-206. This arrangement is enabled by the specific configuration of the transmission section 167 and results in a compact structure of the packaged boost assembly 121 with a significantly reduced footprint.

Figure 10:
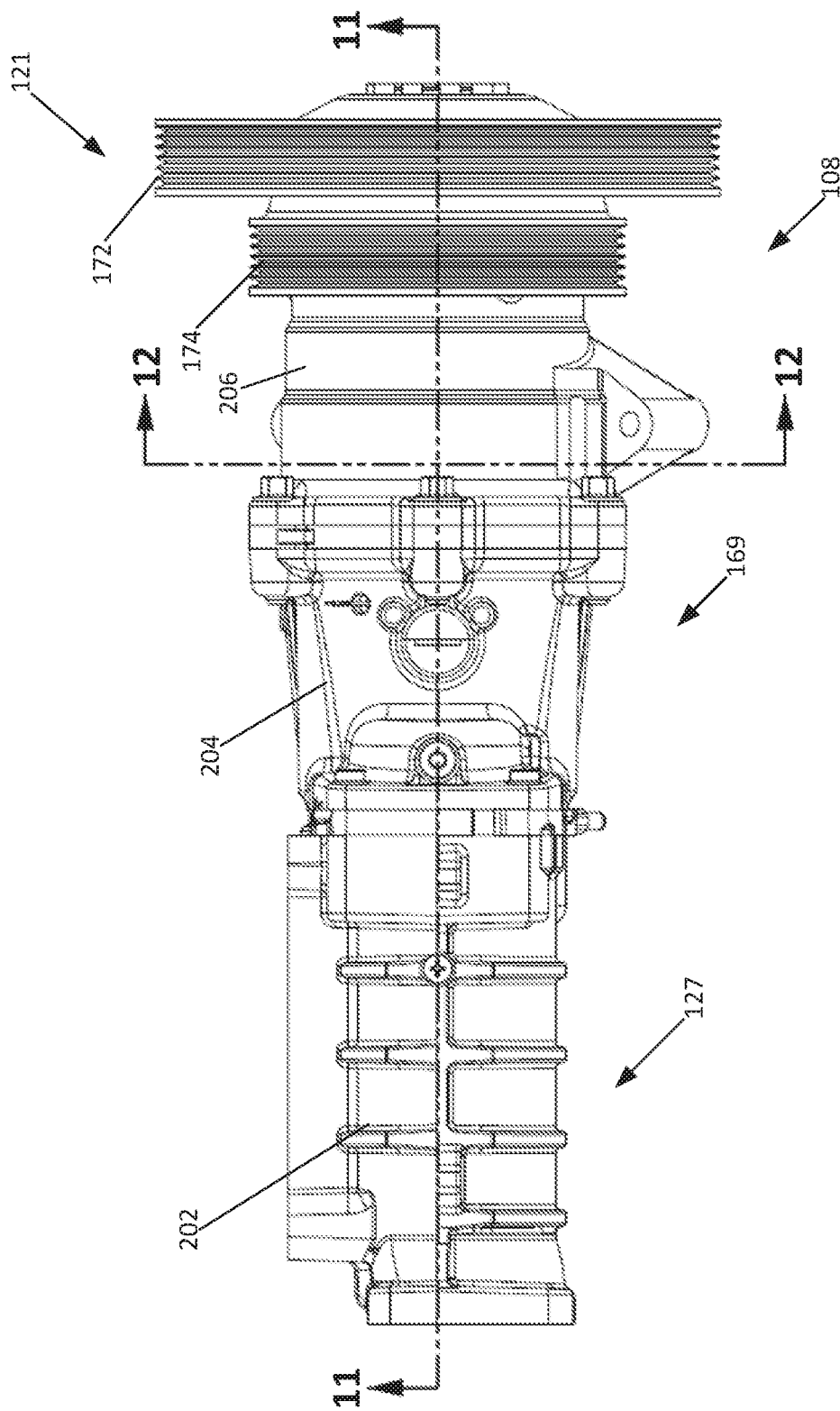
FIG. 10 is a side view of the packaged boost assembly shown in FIG. 9.

Referring to FIG. 10, it can be seen that the supercharger section 108 includes a pair of rotors 150 housed within a rotor cavity 212 of the supercharger housing 202, wherein one of the rotors 150 is supported by a shaft 153 while the other of the rotors 150 is supported by a shaft 154. Each of the shafts 153, 154 can be supported by bushings 180 and bearings 182. Timing gears 184 may also be provided on the shafts 153, 154 to ensure appropriate timing between the rotors 150. The supercharger housing 202 and the brake housing 204, as configured, define a gear chamber 214 within which the bearings 182 and timing gears 184 can be housed and lubricated. Seals 186 may be provided to ensure working fluid passing through the rotor chamber 214 does not enter into the gear chamber 212 and to ensure that lubricant within the gear chamber 212 does not pass into the rotor cavity 214.

With continued reference to FIG. 10, the brake section 167 includes a shaft 216 that extends into the gear chamber 214. The shaft 216 is mechanically coupled to the rotor shaft 154. Many suitable means exist for coupling the shafts 216, 154 together. In the example shown, the shafts 216, 154 are coupled together via a mounted flange member 218 and a pin 220 that extends through the flange member 218 and the timing gear 184 associated with shaft 154. In an alternative arrangement, the shafts 154 and 216 can be configured as a single shaft extending through the supercharger housing 202 and the brake housing 204.

Figure 11:
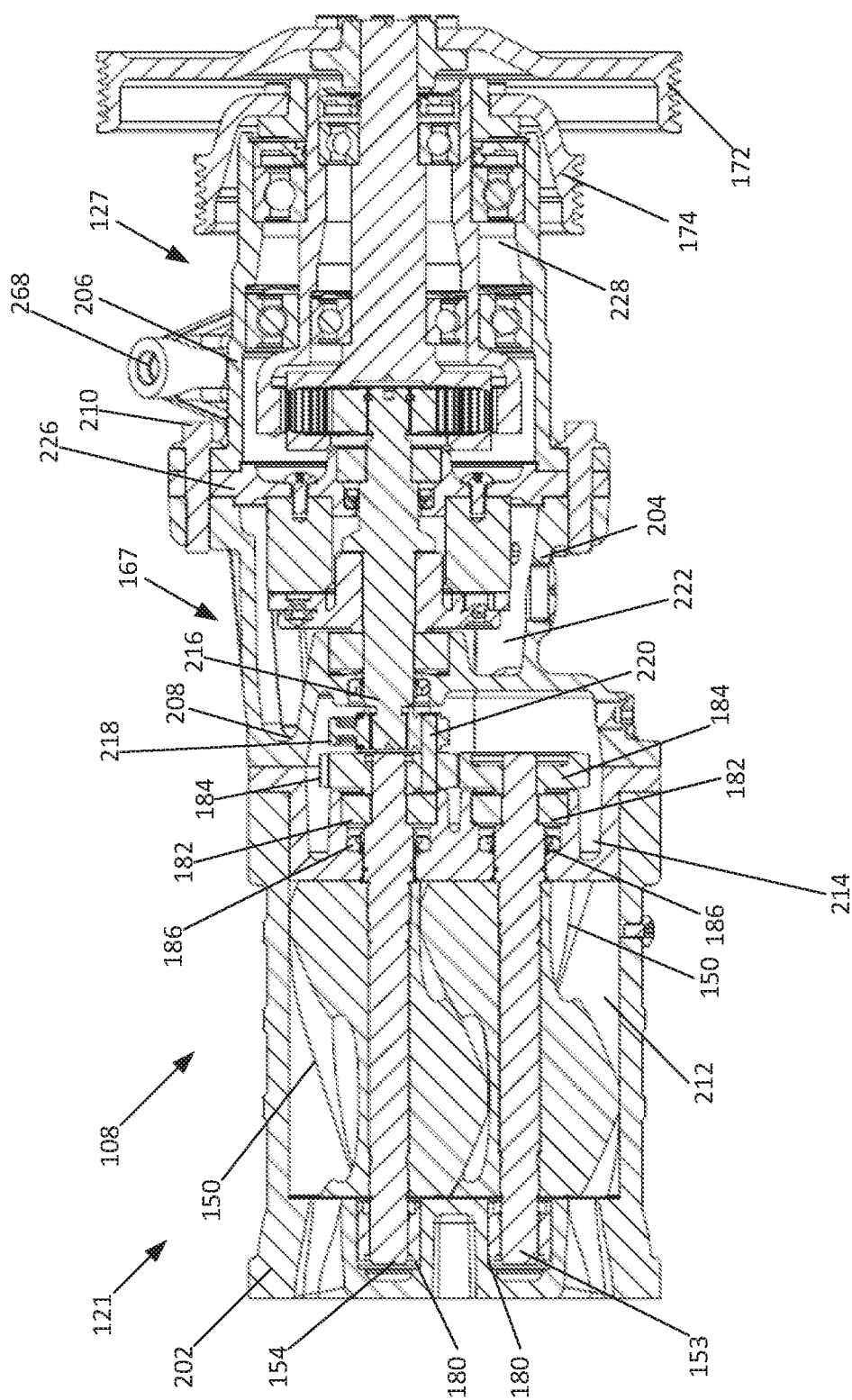
FIG. 11 is a cross-sectional view of the packaged boost assembly shown in FIG. 9, taken along the line 11-11 in FIG. 10.

Referring to FIG. 11, an enlarged view of the brake section 167 is shown. In addition to forming a portion of the gear chamber 214, the brake housing 204 also forms a brake chamber 222 in combination with a brake end plate 226 that is positioned between the brake and transmission housings 204, 206. The brake shaft 216 extends from the gear chamber 214, through the brake chamber 222, and into a gear chamber 228 of the transmission housing and is supported by a pair of bearings 230. Seals 232 may be provided to isolate the brake chamber 222 from the gear chambers 214, 228.

In one aspect, the brake shaft 216 is provided with a step 216a against which a brake rotor subassembly 234 can be mounted to the shaft 216. The interface between the brake rotor 234 and the shaft 216 can be any interface which prevents relative rotation of the two components such that a braking force can be transmitted from the rotor 234 to the shaft 216. One suitable example is a splined connection in which the rotor 234 can slide along the length of the shaft 216 but is prevented from rotating relative to the shaft 216.

In the example shown, the brake section 167 additionally includes a brake coil 236 that is spaced away from a surface of the brake rotor subassembly 234. Taken together, the brake coil 236 and rotor 234 form an electromagnetic brake assembly. This type of brake assembly can be utilized in any of the disclosed embodiments herein. Similarly, other types of brake mechanisms 167 can be utilized for each of the disclosed embodiments for example, clutch-type brakes, pneumatic brakes, and hydraulic brakes. The brake coil 236 is mounted to the brake end plate 226 via fasteners 238 such that the coil 236 is held in a fixed position within the brake chamber 222. When the brake coil 236 is energized, a braking force is imparted onto the brake rotor subassembly 234. As the brake rotor subassembly 234 is mounted to the shaft 216, this braking force is transmitted to the shaft 216. To maintain the desired spacing between the brake rotor 234 and the coil 236, a spring shim 239 may be provided that exerts a force onto the bearing 230 which in turn pushes the rotor 234 towards the brake coil 236 and against the step 216a. A shim 240 may be provided between the step 216a and the rotor 234 to ensure proper relative positioning of the rotor 234 relative to the coil 236. In the example shown, the brake housing 204 is provided with a site window 268 that allows for the measurement and verification of the assembled and desired air gap between the rotor 234 and coil 236.

Figure 12:
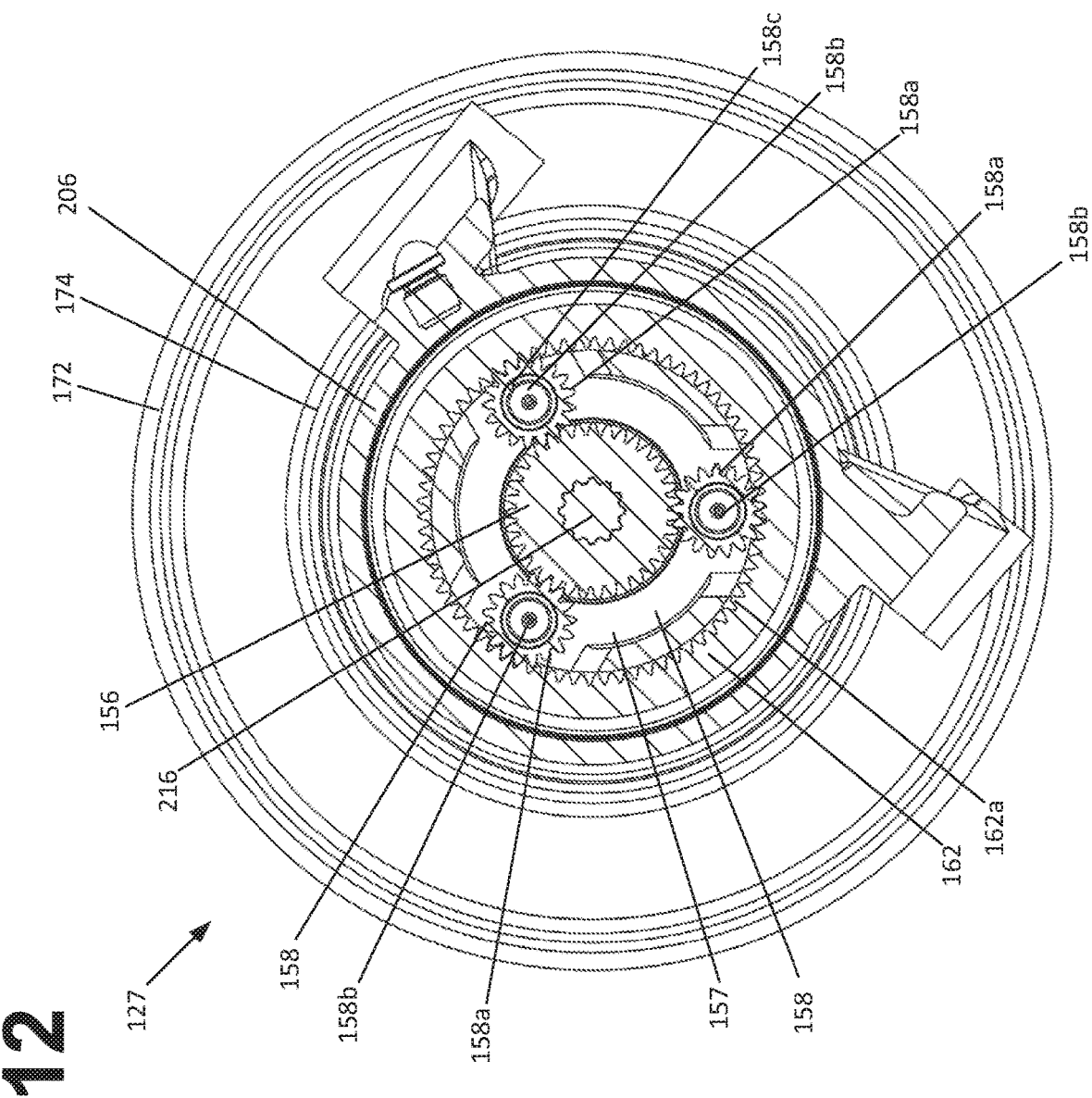
FIG. 12 is a cross-sectional view of the packaged boost assembly shown in FIG. 9, taken along the line 12-12 in FIG. 10.
Figure 16:
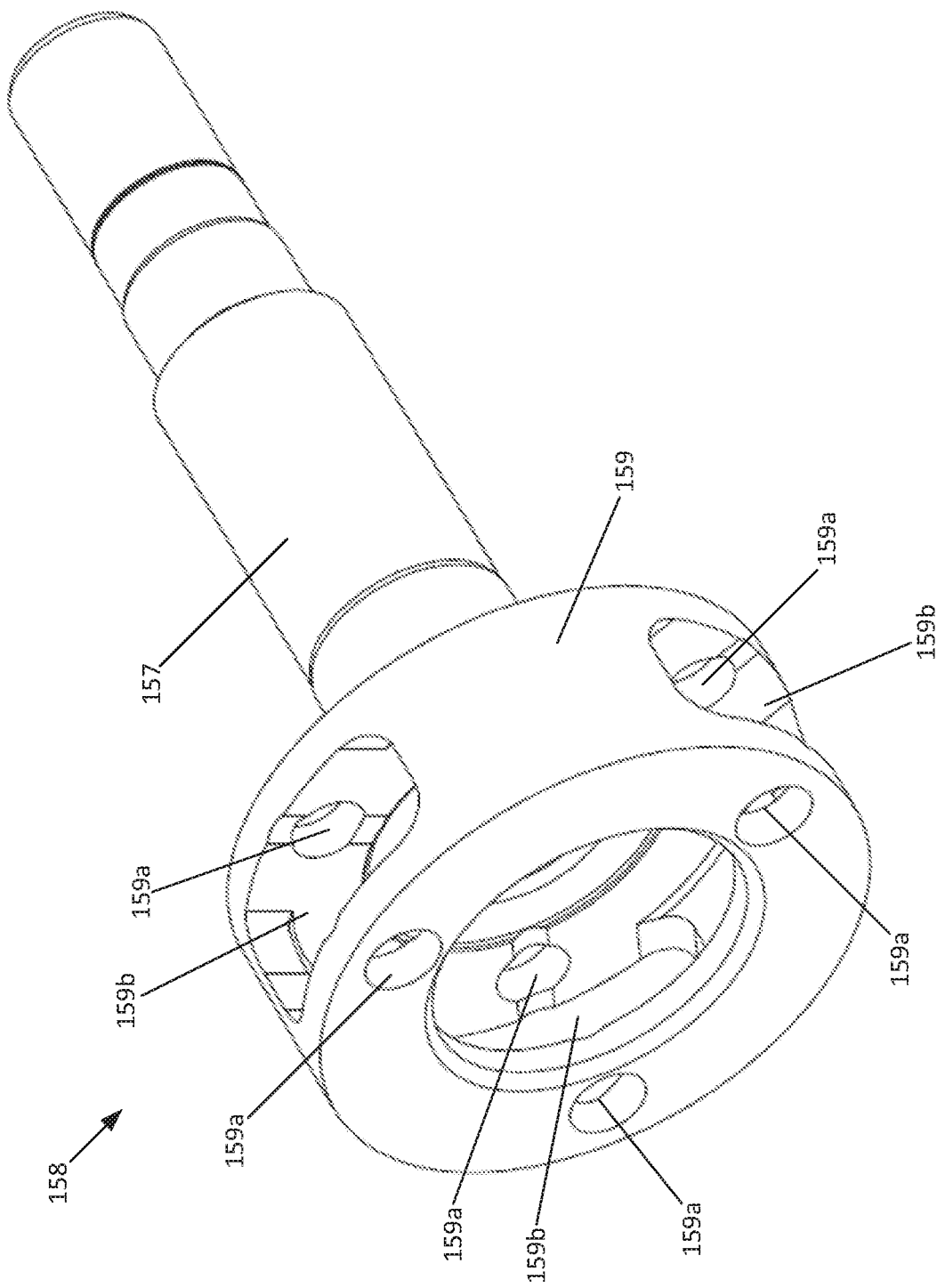
FIG. 16 is a perspective view of a carrier unit of the packaged boost system shown in FIG. 9.
Figure 17:
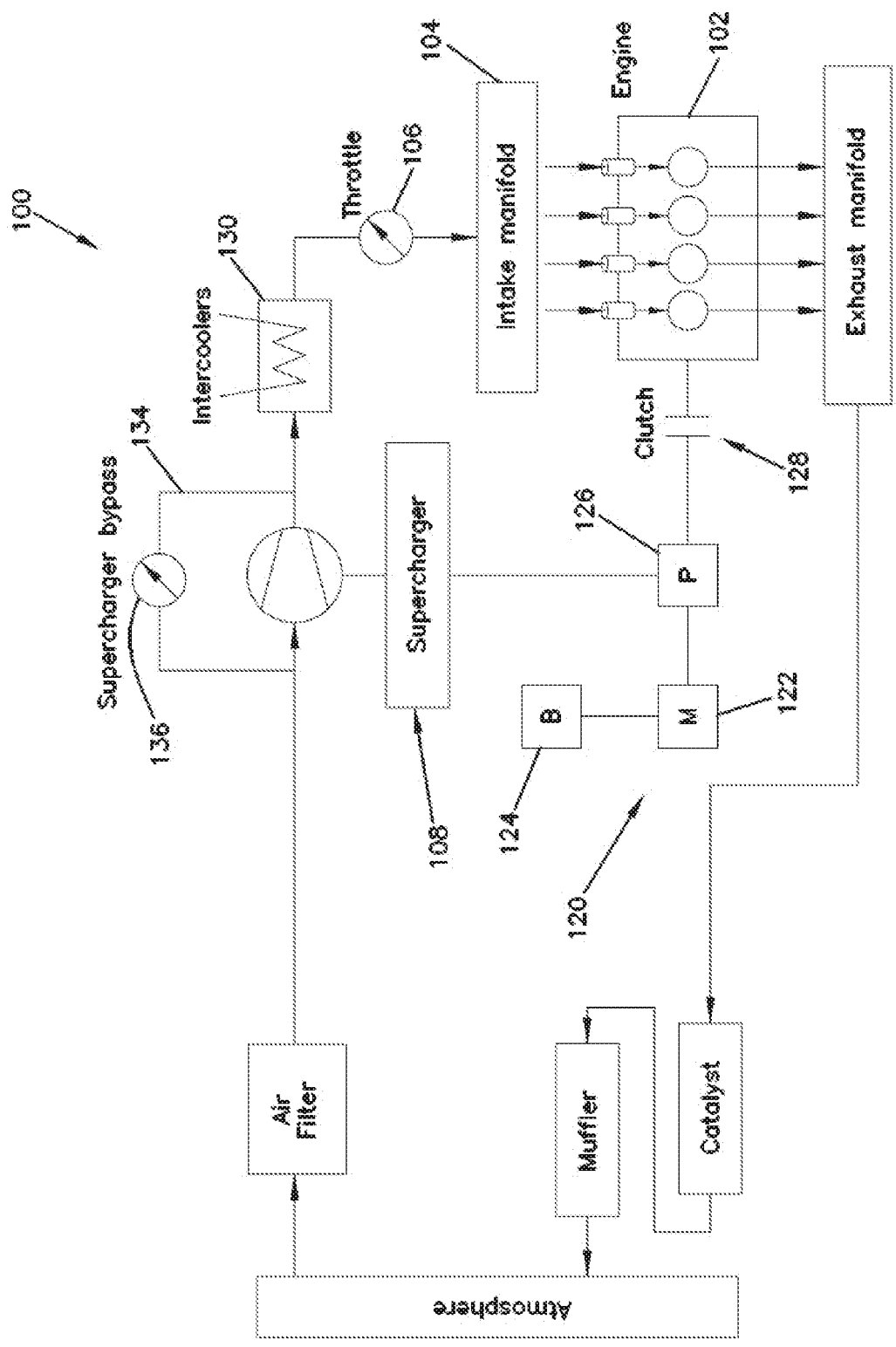
FIG. 17 is a system layout showing an example system in accordance with the principles of the present disclosure incorporated in which any of the hybrid boost assembly configurations shown in FIGS. 1-16 may be utilized.

Referring to FIG. 12, it can be seen that the brake shaft 216 extends into the transmission housing 206 where the planetary gear set 126 resides. The sun gear 156 is attached to an end of the brake shaft 216 via a snap ring 242. Located about the sun gear is a carrier shaft 157 which retains the planetary gears 158a that orbit about the sun gear 156. In the example shown, the planetary gears 158 are provided as a plurality of gears 158a, each of which is supported by an axle 158b with needles 158c therebetween. The axles 158b are secured to the carrier shaft 157. Referring to FIG. 16, it can be seen that the carrier 158 includes a carrier head 159 integrally formed with the carrier shaft 157. The carrier head 159 includes aperture pairs 159a for receiving the planet gear axles 158b and apertures 159b through which the planet gears 158a extend to contact the teeth of the ring gear 162a and the teeth of the sun gear 156. In one example, oil orifices are cross-drilled in the planet axles to provide lubrication to the planet needle bearings. In some examples, ball bearings may alternatively be utilized. In the embodiment shown, three planet gears 158 are provided, however, other numbers of gears may be used, for example, four, five, or six gears.

At the other end of the carrier shaft 157, the pulley 172 is attached via a hub 244 and fasteners 246. The carrier shaft 157 is supported by a pair of bearings 248 which are in turn supported by a hollow ring gear shaft 162. Accordingly, the carrier shaft 157 is rotatable within the ring gear shaft 162.

Figure 15:
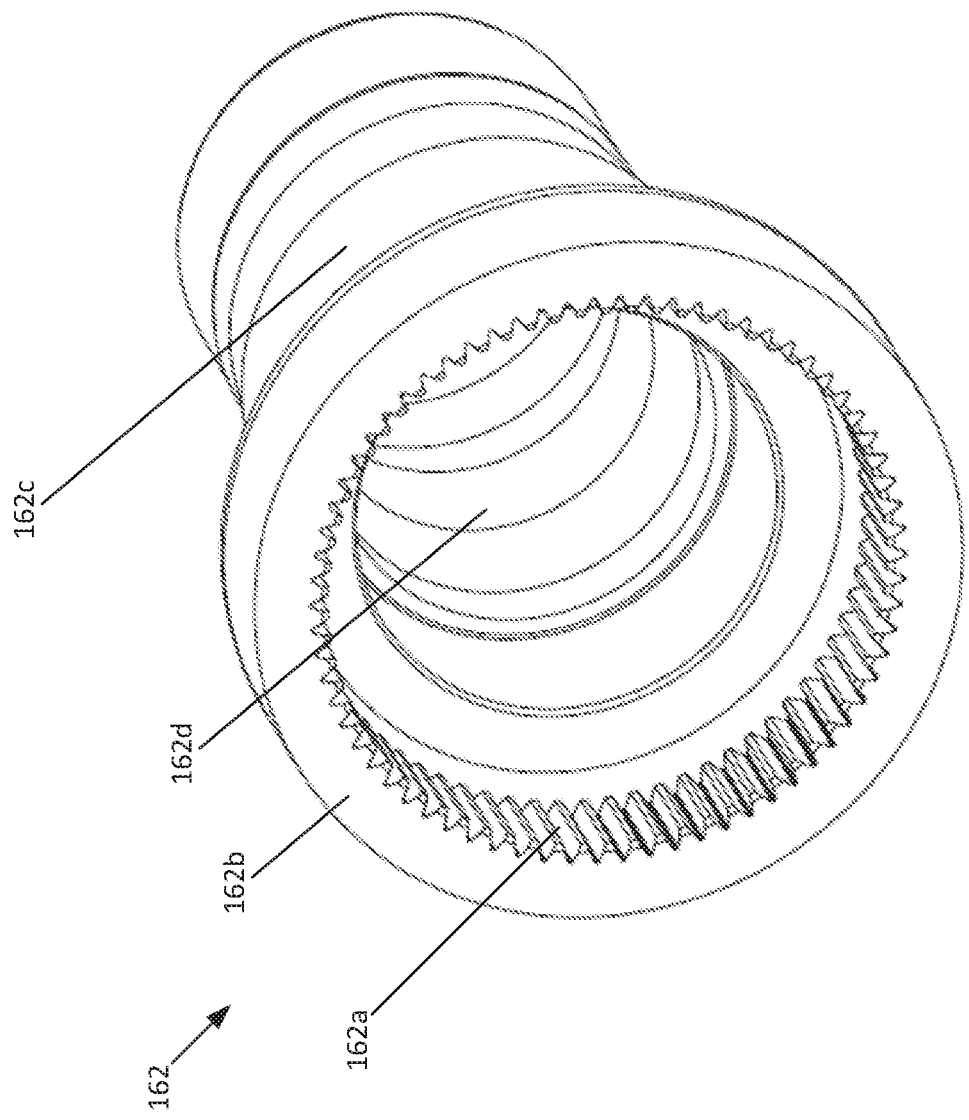
FIG. 15 is a perspective view of a ring gear unit of the packaged boost system shown in FIG. 9.

The ring gear shaft 162 is provided with an integral ring gear 162a at one end and is secured to the pulley 174 at an opposite end via hub 250 and fasteners 252. Referring to FIG. 15, it can be seen that the ring gear shaft 162 defines a hollow interior 162d and includes an enlarged head portion 162b to accommodate the ring gear 162a which has a larger internal diameter than the main portion 162c of the shaft 162. Notably, the ring gear shaft 162 and a portion of the pulley 174 extend within the interior space defined by the pulley 172. This construction allows for the pulleys 172, 174 to be located in close proximity to each other, thus resulting in a lower total axial length of the boost assembly 121. The ring gear shaft 162 is supported by a pair of bearings 254 which are in turn supported by the transmission housing 206 to allow the ring gear shaft 162 to be rotatable with respect to the housing 206. In the embodiment shown, the bearings 248, 254 are ball bearings, but other bearing types may be used.

The transmission part 127 can include additional components, such as seals 256 and 258 which close off the chamber 228 from the open front end of the housing 206 by creating a seal against the rotating shafts 158, 162. Retainer 260 and snap ring 262 may be respectively provided to hold the seals 256, 260 in the proper position and to protect the seals from the hubs 244, 250. The seals 256, 260 are also configured to allow for bi-directional relative rotation of the shafts 157, 162. Springs 264, 266 may also be provided to retain the bearings 254 and 248 in the desired position against shoulders provided in the respective shafts. A snap ring 268 may also be provided to hold bearing 230 in position on the shaft 216. In the example shown, the interior 228 of the transmission housing 206 may be filled with a lubricant and permanently sealed, wherein the lubricant is for lubricating the planet gear assembly 126 and bearings 248, 254. In alternative designs, lubricant can be circulated through the transmission housing interior 228.

The configuration of the packaged boost assembly 121 provides additional advantages. For example, each of the pulleys 172, 174 can be easily removed and replaced with different sized pulleys, thereby allowing the packaged boost assembly 121 to be readily reconfigured for different drive ratios. This is illustrated at FIG. 14 where different diameter pulleys 172, 174 are provided and at FIG. 14A where same diameter pulleys 172, 174 are provided. Additionally, because the brake 167 is positioned upstream of the supercharger 108 in a bolt-on fashion, the supercharger 108 can also be easily replaced with a different unit having a different displacement or design while retaining the existing transmission assembly 127. Furthermore, the generally axisymmetric design of the packaged boost assembly 121 allows for the unit to be installed at any rotation angle about the shafts without the gears being starved for lubrication while dynamic stresses due to shifts of the Center of Mass of the unit are minimized. Yet another benefit of the disclosed configuration is the compact nature of the unit in both the axial direction and in the radial dimension resulting in a smaller unit diameter, which allows for the unit to be mounted closer to the engine. The mounting location of the unit is thus not dependent upon needing to package a large integrated unit. The unit can also be remote mounted relative to the electric motor. The design can also be adapted to existing alternator or motor generator technology as there is no need for a custom or high speed motor to assist the boost assembly. The assembly 121 also does not require lubrication or cooling from an external source. Yet another advantage of the disclosed design is that the pulley 174 is centered over the bearings 254 in the radial direction which results in minimized bending of the shaft 162, which in turns minimizes bearing reaction force. The disclosed design also places the pulleys 172, 174 in close proximity to the bearings 248, 254 in the axial direction which also minimizes bending and bearing reaction forces as well.

In one arrangement, the packaged boost assembly 121 is configured in a "normally closed" brake configuration, meaning that the brake assembly is engaged to prevent rotation of shaft 156. This configuration places the supercharger 108 in a locked state such that no boost is provided until activation of the assembly 121 when current is not being applied to the coil 136. This configuration allows for potential fuel economy advantages in that the assembly 121 is unpowered when boosting is not needed in cases where the engine can run in a naturally aspirated mode in a fuel economy type mode. This configuration also provides a safety benefit in that the supercharger 108 is automatically disabled if the brake assembly shorts or loses power. Additionally, this configuration does not result in the loss of alternator functionality due to brake failure and instead only results in the loss of boost from the supercharger. The modular brake design also allows for easier change in electrical architecture (e.g. 12V/24V/48V) without requiring major unit redesign. In one example, simple brake "on-off" (i.e., no slipping) brake controls can be used due to variable speed functionality of the system to allow for targeting of a zero differential speed across the brake.

Although the packaged boost assembly 121 is provided with power transmission components in the form of pulleys 172, 174, other power transmission components may be utilized, for example, gears and cogs which can drive other gears and cogs associated with the motor 122 and engine 102 directly or with, for example, a chain. Additionally, although reference is made herein to an internal combustion engine 102, the disclosed packaged boost assembly 121 is usable with other types of power plants 102 that may or may not be associated with a vehicle. For example, the packaged boost assembly 121 could be used in conjunction with a fuel cell and/or could be used in conjunction with a power generator set.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A packaged boost system for a power plant, the hybrid boost system comprising:
   a. a supercharger housing a pair of Roots-type rotors operably coupled to a supercharger input shaft;
   b. a brake assembly having a brake operably coupled to a brake shaft, the brake being configured to provide a braking force on the brake shaft and the supercharger input shaft when a current is applied to the brake, the brake shaft being coupled to the supercharger input shaft, wherein the brake assembly is housed in a brake assembly housing coupled directly to the supercharger housing;

c. a planetary gear set including a sun gear, a ring gear and a carrier that carries planetary gears, the carrier, the sun gear and the ring gear being configured to rotate about a central axis of the planetary gear set, wherein the sun gear is coupled to the brake shaft, wherein the planetary gear set is housed in a transmission housing mechanically coupled directly to the brake housing such that the brake housing is disposed between the supercharger housing and the transmission housing;

d. a first power transmission component operably coupled to the carrier, the first power transmission component being external to the transmission housing and configured to engage with a power input of the power plant; and e. a second power transmission component operably connected to the ring gear, the second power transmission component being external to the transmission housing and configured to engage with an electric motor.

2. The packaged boost system of claim 1, wherein:

a. the first and second power transmission components are first and second pulleys and the power plant is an internal combustion engine;

b. the first pulley is configured to engage with a front end accessory drive of the internal combustion engine via a first drive belt; and c. the second pulley is configured to engage with the electric motor via a second drive belt.

3. The packaged boost system of claim 1, wherein the first power transmission component is operably coupled to the carrier via a first shaft and wherein the second power transmission component is operably coupled to the ring gear via a second shaft, wherein the first shaft is at least partially disposed within the second shaft.

4. The packaged boost system of claim 3, wherein the second shaft is supported by ball bearings located between the second shaft and an interior wall of the transmission housing and wherein the first shaft is supported by ball bearings located between the first shaft and the second shaft.

5. The packaged boost system of claim 4, wherein the first shaft extends beyond the second shaft.

6. The packaged boost system of claim 5, wherein the first power transmission component is a first pulley and the second power transmission component is a second pulley.

7. The packaged boost system of claim 6, wherein a portion of the first pulley overlaps with a portion of the second pulley.

8. The packaged boost system of claim 6, wherein the second pulley is radially aligned with a first bearing located between the second shaft and an interior wall of the transmission housing.

9. The packaged boost system of claim 6, wherein the first pulley and the second pulley have equal diameters.

10. The packaged boost system of claim 6, wherein the first pulley and the second pulley have different diameters.

11. The packaged boost system of claim 3, wherein the supercharger input shaft, the brake shaft, the first shaft, and the second shaft are coaxially aligned.

12. The packaged boost system of claim 3, wherein the second shaft and the ring gear are integrally formed as a single component.

13. The packaged boost system of claim 3, wherein the first shaft and the carrier are integrally formed as a single component.

14. The packaged boost system of claim 1, wherein the supercharger input shaft and the brake shaft are coupled together by a pin extending through a timing gear coupled to the supercharger input shaft and through a flange member associated with the brake shaft.

* * * * *